United States Patent [19]

Hesse et al.

[11] Patent Number: 5,184,058
[45] Date of Patent: Feb. 2, 1993

[54] METHOD AND SYSTEM FOR ELECTRICITY STORAGE AND DISCHARGE

[75] Inventors: Bradley J. Hesse, Syracuse; Philip J. Gentile, East Syracuse, both of N.Y.

[73] Assignee: The Fleming Group, Syracuse, N.Y.

[21] Appl. No.: 703,231

[22] Filed: May 20, 1991

[51] Int. Cl.$^5$ .............................................. H02J 7/00
[52] U.S. Cl. ......................................... 320/4; 320/28; 320/43; 320/59
[58] Field of Search ................... 320/4, 15, 28, 43, 59, 320/56, 61; 363/59

[56] References Cited

U.S. PATENT DOCUMENTS

| | | | |
|---|---|---|---|
| 3,586,870 | 6/1971 | Cwiak | 307/66 |
| 3,629,680 | 12/1971 | Baynes et al. | 320/2 |
| 3,816,806 | 6/1974 | Mas | 320/20 |
| 3,847,671 | 11/1974 | Leparulo et al. | 429/26 |
| 4,054,826 | 10/1977 | Wahlstrom | 320/61 |
| 4,161,682 | 7/1979 | Corvette | 320/2 |
| 4,282,475 | 8/1981 | Milton | 320/6 |
| 4,387,333 | 6/1983 | St. Ledger | 320/21 |
| 4,496,896 | 1/1985 | Melacik et al. | 320/2 |
| 4,532,418 | 7/1985 | Meeso et al. | 235/381 |
| 4,638,236 | 1/1987 | Carr et al. | 320/21 |
| 4,799,003 | 1/1989 | Tu et al. | 322/29 |
| 4,876,496 | 2/1988 | Dunlan | 320/31 |
| 5,057,762 | 10/1991 | Goedken et al. | 320/15 |

Primary Examiner—Steven L. Stephan
Assistant Examiner—Ben M. Davidson
Attorney, Agent, or Firm—Salzman & Levy

[57] ABSTRACT

The present invention features a method and system for storing electrical energy, and then using the stored energy to recharge automobiles. The system of the invention features a number of storage and recharging facilities that are connected to a main power generating station. Power is generally demanded from the power station in the evening or during off-peak power demand periods, in order to obtain lower rates from the power utility. Also, off-peak power loading does not put a strain on the power system. The energy obtained from the power utility company is then stored at each recharging facility in a bank of capacitors. A high voltage transformer and rectifier arranged ahead of the capacitor banks converts the incoming AC high voltage power from the utility to the required DC voltage for capacitor storage. The controller distributes power to a number of charging bays that are connected to the capacitor bank. A vehicle needing charging pulls into an individual bay in the recharging facility, and is connected to a metering device having feedback control. A sensing unit interrogates the power remaining in the batteries of the vehicle, and passes this information onto a controller. In this manner, the exact amount of required energy is transferred to the vehicle.

14 Claims, 1 Drawing Sheet

METHOD AND SYSTEM FOR ELECTRICITY STORAGE AND DISCHARGE

FIELD OF THE INVENTION

The invention pertains to a method and system for storing and discharging electrical energy, and more particularly to an electricity storage and vehicle recharging system utilized for recharging electrical vehicles in similar fashion to present day automobile fueling at gas stations.

BACKGROUND OF THE INVENTION

In recent times, much thought has been given to alternative energy sources as a means to power automobiles. Petroleum based fuels, such as gasolines, are polluting and represent a finite energy source.

Electrically driven vehicles have many advantages over automobiles that run on fossil fuels. One of the major advantages of an electric car is the lack of exhaust pollutants. Another advantage is the reduction in the noise level of electrical vehicles over those driven by combustion engines.

One of the drawbacks to implementing electric cars as a viable alternative to present day combustion engine vehicles is the limited energy storage and supply provided by present, on-board battery systems. Storage batteries for automobiles must be able to supply enough power to drive an automobile for about 250 miles without recharging. Present day batteries, while not able to achieve this goal, are rapidly being improved. Continuous progress is being made in the on-board batteries needed to power the electric cars, and it is very likely that a practical battery system will be available in only a few years.

Another problem inherent with electric vehicle usage is the recharging of the vehicle's batteries on the road. If there are many electric vehicles in use, direct charging during daylight hours or during peak electric energy demand periods becomes a serious issue to today's electric utilities.

Recharging stations using banks of lead-acid storage batteries to recharge electric vehicles can draw and store electricity from power generation stations at night or during off-peak hours for subsequently supplying vehicles during the day. However, problems associated with lead-acid batteries include their generation of potentially explosive hydrogen gas, and their relatively short operational lifetimes. Thus, an electricity storage and charging station utilizing a lead-acid battery system would require a high degree of maintenance, and could potentially be a dangerous facility, if mismanaged.

In order to overcome many of the drawbacks of a battery storage system, the present invention proposes to store electrical energy utilizing capacitors. Any other suitable electricity storage mechanism can also be used without departing from the scope of the present invention. Capacitors are a particularly attractive alternative to battery storage, however, because they: (1) charge and discharge electricity quickly, (2) do not need maintenance, (3) have fairly low losses, and (4) feature long operational lives.

The present invention contemplates the use of many charging stations deriving their power from a central electrical generating source, such as an electrical power plant. Each charging station would use a control strategy for charging its electric energy storage means during low demand periods. This would be accomplished by means of a controller. The controller could facilitate simple off-peak charging, real-time-price-based control, and direct utility control. Moreover, each of the charging stations would be equipped with a plurality of bays or charging positions, each capable of charging a separate vehicle. The station charge controller would regulate the amount of power drawn by each charging station from the main generating source. Each vehicle bay would have a feedback control for measuring the state-of-charge of the vehicle storage system and for regulating and measuring the exact amount of energy discharged to the individual automobile. Measuring energy delivered to a vehicle can be used for billing purposes.

The ability to draw power during periods advantageous to the electric utility, to charge automobiles with exacting amounts of energy, as required, and to provide billing information, makes the aforementioned invention most attractive as a practical vehicular energy charging system.

DISCUSSION OF RELATED ART

In U.S. Pat. No. 4,532,418, issued to Meese et al on Jul. 30, 1985, a microcomputerized system for charging electric vehicles is shown. Electric vehicles are parked at a facility having a plurality of parking meters, which also serve as individual charging stations. A credit-like charge card can be used to activate the charging process and to initialize the microcomputer program for keeping track of energy usage and billing. This patented system will aggravate utility peak demand periods as it requires electric energy from the utility at the time of vehicle charging. By contrast, the present invention suggests off-peak, low demand period charging of a charging station's batteries which in turn provide electric energy to vehicles during on-peak or high demand periods of the local electric utility.

In U.S. Pat. No. 4,309,644, issued to Relmers et al on Jan. 5, 1982, an electrical vehicle controller for connection to a charge station is shown. The system features an on-board vehicular system, wherein the controller allows the vehicle to alternately operate in a propulsion mode or in a charge mode.

In U.S. Pat. No. 3,955,657, issued to Bossi on May 11, 1976, a fast recharge system is illustrated for battery powered vehicles. The vehicles are generally those battery powered vehicles. The vehicles are generally those of a mass-transit variety, such as railway or trolley cars. The purpose of the inventive system is to provide a mass-transit vehicle with the flexibility of movement available with ordinary automobiles, i.e., absent a given pathway track. The vehicles connect directly to utility AC power.

SUMMARY OF THE INVENTION

In accordance with the present invention, there is provided a method and system for storing electrical energy, and then using the stored energy to recharge automobiles. The system of the invention features a number of storage and recharging facilities that are connected to a main power generating station. A controller at each recharging facility regulates the power drawn from the power station. Power is generally demanded from the power station in the evening, during off-peak power demand periods in direct response to the utility's hourly pricing structure, or via direct utility connect/disconnect command in order to obtain lower rates while minimizing the demand placed on the power system. The energy obtained from the power utility company is then stored at each recharging facility in a bank of capacitors or in other means of storing electric energy.

A pair of transfer switches, disposed before and after the capacitive storage banks, allow the by-passing of the capacitors, and the direct connection to utility power. A high voltage transformer and rectifier arranged ahead of the capacitor banks converts the incoming AC high voltage power from the utility to lower level DC voltage for capacitor storage. The controller distributes power to a number of charging bays that are connected to the capacitor bank. Vehicles needing charging pull into an individual bay in the recharging facility, and are connected to a metering device having feedback control. A sensing unit interrogates the vehicle batteries state-of-charge and passes this information on to the controller. In this manner, the exact amount of required energy is transferred to the vehicle. Some vehicles may use a system that directly draws 60 Hz, AC house current. In such a case, each bay has a DC to AC inverter for converting the capacitor DC voltage to alternating current.

BRIEF DESCRIPTION OF THE DRAWINGS

A complete understanding of the present invention may be obtained by reference to the accompanying drawings, when considered in conjunction with the accompanying detailed description, in which.

DESCRIPTION OF THE PREFERRED EMBODIMENT

Generally speaking, the invention features a recharging method and system for use in supplying electrically driven vehicles with power along their travel routes. The system allows for charging of the batteries of an electric automobile. The invention contemplates a number of recharging facilities located along well travelled highways or fleet vehicle garage/maintenance facilities, each of which is directly connected to a main power generating station. The recharging facility draws power from the main generating plant during off-peak demand hours, and stores the energy in a bank of capacitors or other suitable and available electric energy storage means. The capacitors discharge the stored energy under the influence of a controller that regulates the power to each individual bay.

For purposes of brevity and clarity, like components will have the same designation throughout the figures.

Figure 1:
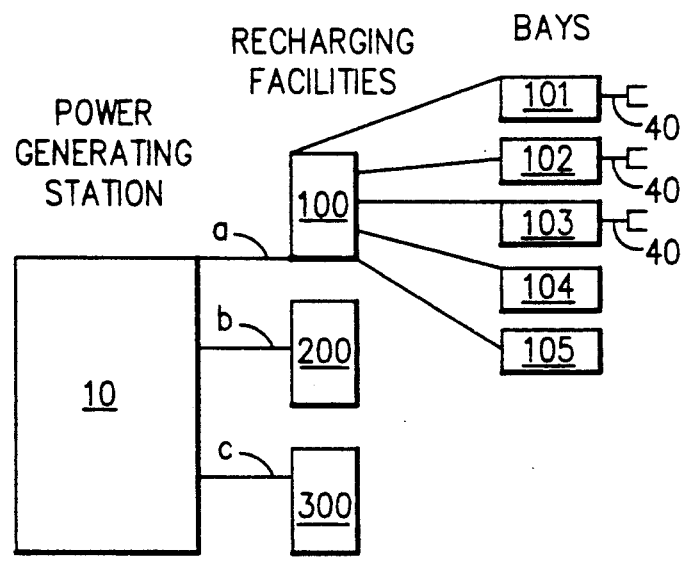
FIG. 1 is a schematic diagram of the vehicle charging system of this invention.

Now referring to FIG. 1, a main power generating station 10 is connected to a number of respective recharging facilities 100, 200, 300, . . . etc., via electrical supply lines a, b, c, . . . etc., as shown. Each electrical facility 100, 200, 300 draws power from the main power generating station 10, and stores the energy in a bank of capacitors 3, illustrated in FIG. 2. Each electrical facility 100, 200, 300 comprises a plurality of recharging bays 101, 102, 103, . . . etc., that draw their electricity from the bank of capacitors 3 at their particular electrical facility.

Electrically powered vehicles in need of recharging their vehicular storage batteries pull into one of the unoccupied recharging bays 101, 102, 103, and connect their recharging plugs (not shown) to a recharging receptacle 40.

Figure 2:
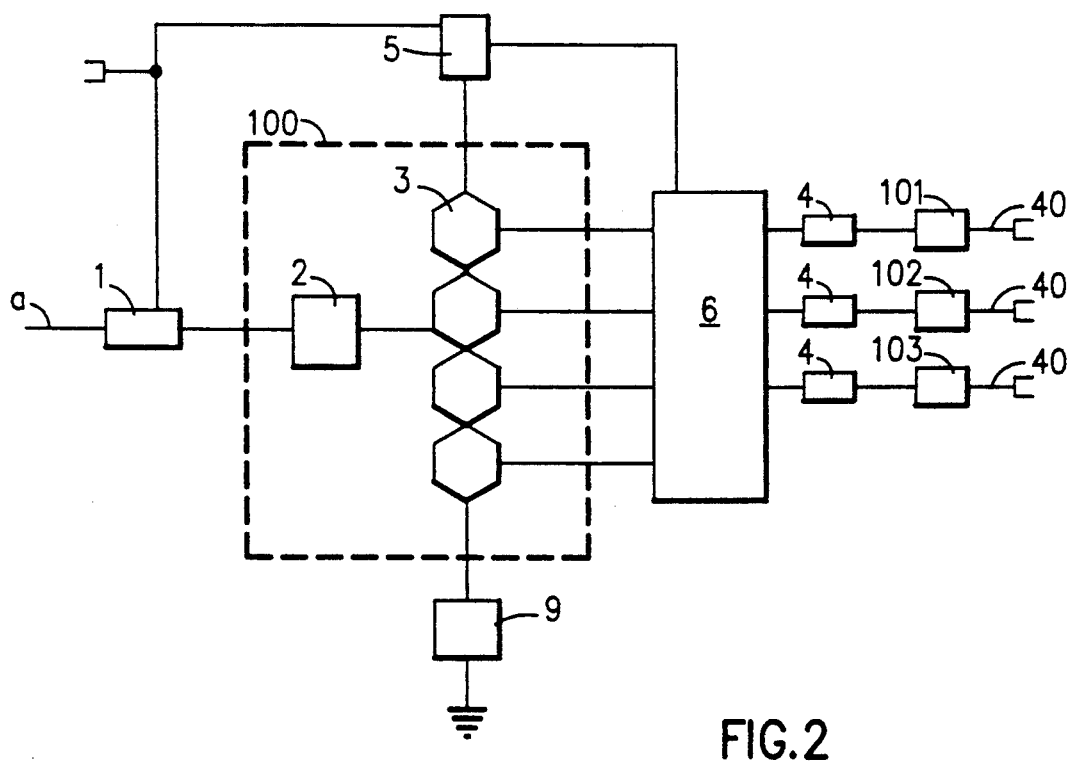
FIG. 2 is a schematic circuit diagram for the recharging facility shown in FIG. 1.

Now referring to FIG. 2, a circuit diagram for a typical one of the recharging facilities 100, is depicted. The power drawn from the main power plant enters recharging facility 100 over line a, as shown. The recharging facility draws its power from the main power plant during off-peak hours in order to obtain the most economical rates, and to prevent a strain upon the generating station 10. The recharging facility stores its electrical energy in a bank of capacitors 3.

Transfer switches 1 and 5 on the input and output of the facility, respectively, allow for by-pass of the storage system under the control of controller 6. The transfer switches 1 and 5 allow for direct utility power consumption, and for emergency discharging of the capacitor banks 3 to ground via emergency cut-out device 9.

The transformer and rectifier 2 transforms the incoming power on line a from standard AC voltage utility levels to DC potential at capacitive storage levels. The bank of capacitors 3 can furnish power to any bay 101, 102, 103, . . . etc., at any time, under the control of controller 6.

A DC to AC inverter 4 converts DC capacitor voltage to alternating AC voltage at house current levels, for those outlet receptacles.

Current directed to the capacitor bank from the power facility shall be limited to a predetermined capacity (e.g., 20 KW) by means of a phase control or other similar system. Capacitor charging shall be self limiting and will stop when capacitor voltage equals peak input voltage. Transfer switch 1 directs voltage to the transformer and rectifier 2. Capacitor sizing is calculated according to the following formula:

$$C = dV \frac{P_o t}{E_o}$$

where:
$P_o$ = output power of storage system
$E_o$ = output voltage of storage system
t = system operation time in seconds
C = capacitance expressed in Farads.

When discharging energy from the bank of capacitors 3, the automobile's recharge system is plugged into receptacle 40 in the chosen bay. The recharging is metered, and can be financed by credit card via a processor (not shown). The controller 6 will discharge the correct amount of energy to the vehicle via a feedback sensor (not shown) that can be located in receptacle 40. The sensor measures the amount of power required to recharge the vehicle.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A recharging system for electrically powered vehicles comprising:
   a plurality of recharging facilities for electrically recharging electrically driven vehicles, each recharging facility being located along any travel route of said driven vehicles and drawing its power from a main power generating plant during off-peak hours for recharging said vehicles at any time;

a bank of capacitors disposed at each of said recharging facilities for storing said power drawn from the main power generating plant, and having the capability of discharging said power to vehicles in need of electrical recharge;

a number of recharging bays disposed at each recharging facility having plug-in receptacles for recharging said electrically driven vehicles; and a controller disposed between each plug-in receptacle and said bank of capacitors for controlling the discharge of energy to a vehicle being electrically recharged.

2. The recharging system for electrically powered vehicles in accordance with claim 1, further comprising a transformer and rectifier connected ahead of said bank of capacitors for converting power drawn from said power generating plant to power at capacitor voltage levels.

3. The recharging system for electrically powered vehicles in accordance with claim 1, further comprising an inverter operatively connected to each plug-in receptacle for converting capacitive power to household current.

4. The recharging system for electrically powered vehicles in accordance with claim 1, wherein a size of a capacitor in said bank of capacitors is determined according to the formula:

$$C = dV \frac{P_o t}{E_o}$$

where:
$P_o$ = output power of storage system
$E_o$ = output voltage of storage system
$t$ = system operation time in seconds
$C$ = capacitance expressed in Farads.

5. The recharging system for electrically powered vehicles in accordance with claim 1, further comprising a pair of transfer switches operatively connected to said bank of capacitors for by-passing power drawn from said power generating plant.

6. A method of recharging electrically driven vehicles, comprising the steps of:

a) drawing power from a main power generating plant during hours of off-peak demand;

b) transforming and rectifying said power for storage in a bank of capacitors each located at one of a plurality of recharging facilities disposed along travelled routes of said electrically driven vehicles, said recharging facilities having a number of recharging bays for recharging individual electrically driven vehicles; and c) discharging the power stored in said bank of capacitors to electrically driven vehicles each disposed in respective ones of said recharging bays.

7. The method of recharging electrically driven vehicles in accordance with claim 6, further comprising the step of:

d) measuring the amount of electricity discharged from said bank of capacitors to each of said electrically driven vehicles.

8. The method of recharging electrically driven vehicles in accordance with claim 7, further comprising the step of:

e) calculating the billing fee from said measured amount of electricity discharged from said bank of capacitors.

9. The method of recharging electrically driven vehicles in accordance with claim 6, wherein said discharging step (c) comprises the additional step of inverting capacitor power to household current.

10. The method of recharging electrically driven vehicles in accordance with claim 6, wherein said discharging step (c) comprises the additional step of sensing the state-of-charge of each electrically driven vehicle being recharged.

11. A recharging system for electrically powered vehicles comprising:

a plurality of recharging facilities for electrically recharging electrically driven vehicles, each recharging facility being located along any travel route of said driven vehicles and drawing its power from a main power generating plant during off-peak hours for recharging said vehicles at any time;

electricity storage means disposed at each of said recharging facilities for storing said power drawn from the main power generating plant, and having the capability of discharging said power to vehicles in need of electrical recharge;

a number of recharging bays disposed at each recharging facility having plug-in receptacles for recharging said electrically driven vehicles; and a controller disposed between each plug-in receptacle and said electricity storage means for controlling the discharge of energy to a vehicle being electrically recharged; and 12. The recharging system for electrically powered vehicles in accordance with claim 11, further comprising a transformer and rectifier connected ahead of said electricity storage means for converting power drawn from said power generating plant to power at capacitor voltage levels.

13. The recharging system for electrically powered vehicles in accordance with claim 11, further comprising an inverter operatively connected to each plug-in receptacle for converting capacitive power to household current.

14. A recharging system for electrically powered vehicles comprising:

a plurality of recharging facilities for electrically recharging electrically driven vehicles, each recharging facility being located along any travel route of said driven vehicles and drawing its power from a main power generating plant during off-peak hours for recharging said vehicles at any time;

a bank of capacitors disposed at each of said recharging facilities for storing said power drawn from the main power generating plant, and having the capability of discharging said power to vehicles in need of electrical recharge;

a pair of transfer switches operatively connected to said bank of capacitors for by-passing power drawn from said power generating plant;

a number of recharging bays disposed at each recharging facility having plug-in receptacles for recharging said electrically driven vehicles; and a controller disposed between each plug-in receptacle and said bank of capacitors for controlling the discharge of energy to a vehicle being electrically recharged.

* * * * *